United States Patent [19]

Hayes

[11] Patent Number: 4,617,876
[45] Date of Patent: Oct. 21, 1986

[54] ANIMAL IDENTIFICATION AND CONTROL SYSTEM

[76] Inventor: Norman J. Hayes, 36 Rd. 2 ABN, Cody, Wyo. 82414

[21] Appl. No.: 675,991

[22] Filed: Nov. 28, 1984

[51] Int. Cl.$^4$ .................. A01K 29/00; A01K 1/02
[52] U.S. Cl. ..................... 119/155; 119/20; 119/27; 119/51 R
[58] Field of Search .............. 119/20, 27, 51 R, 99, 119/155

[56] References Cited

U.S. PATENT DOCUMENTS

| | | | |
|---|---|---|---|
| 2,786,449 | 3/1957 | Dahlerup | 119/99 |
| 3,077,861 | 2/1963 | Eide | 119/20 |
| 3,465,724 | 9/1969 | Broadbent | 119/51 R |
| 3,545,407 | 12/1970 | Moore | 119/155 X |
| 3,929,277 | 12/1975 | Byrne et al. | 119/51 R X |
| 4,129,096 | 12/1978 | Nickel | 119/27 |
| 4,280,448 | 7/1981 | Ostermann | 119/155 |
| 4,288,856 | 9/1981 | Linseth | 119/51 R |
| 4,461,241 | 7/1984 | Ostler | 119/51 R |

*Primary Examiner*—Robert P. Swiatek
*Attorney, Agent, or Firm*—Klaas & Law

[57] ABSTRACT

An animal identification and control system comprising an identification tag on the animal having a signal sending device for sending an identification code signal to a signal receiving device mounted adjacent a water bowl located in juxtaposition to a weighing device in a stall whereby the animal is automatically weighed while drinking from the water bowl in the stall and a weight signal and an identification signal are generated to enable selective processing of the animal.

32 Claims, 11 Drawing Figures

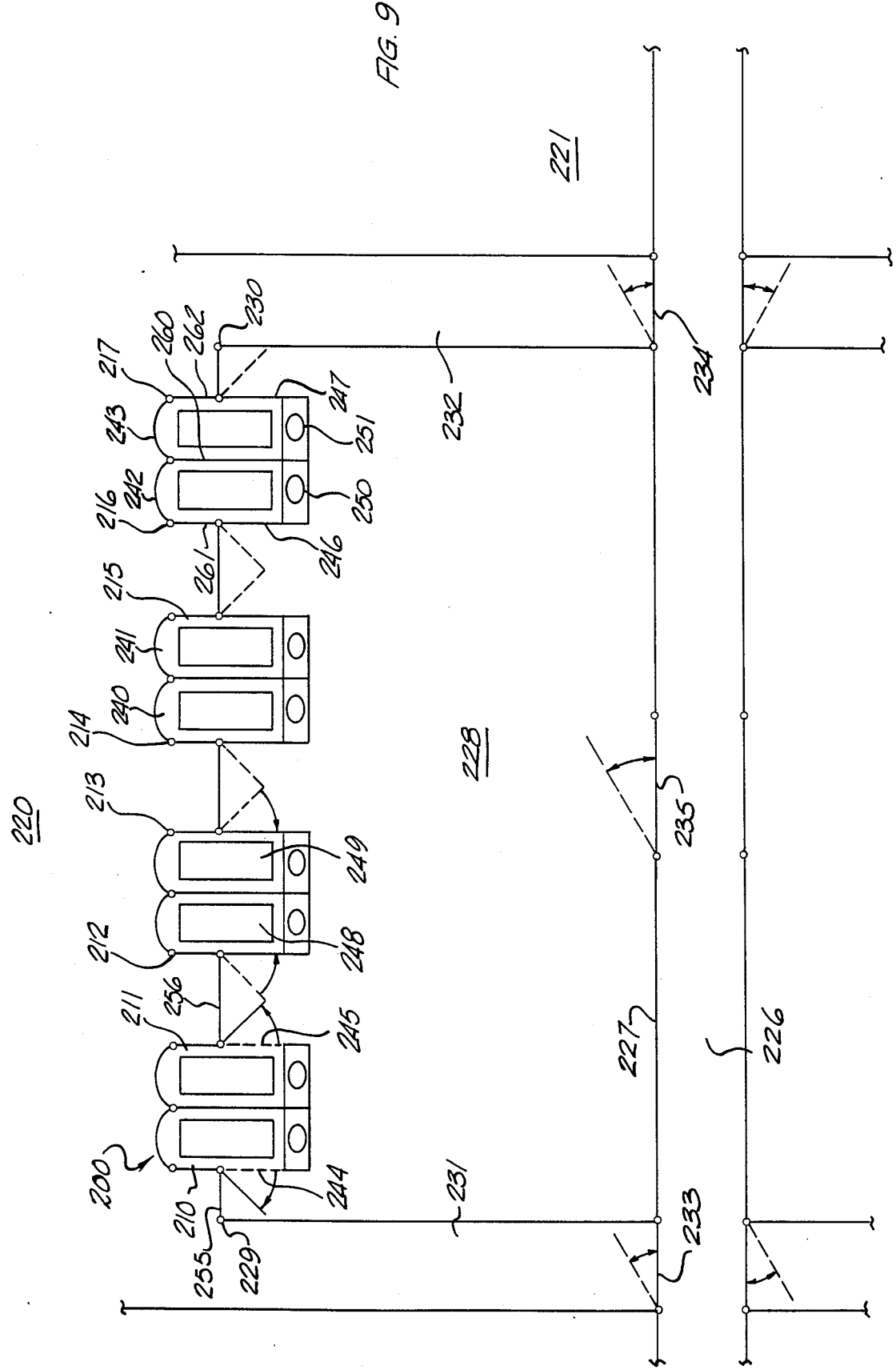

ANIMAL IDENTIFICATION AND CONTROL SYSTEM

BACKGROUND & SUMMARY OF INVENTION

This invention relates to a system for identification and control of animals, such as cattle, and more particularly to a system for identifying a particular animal among a group of animals and controlling placement, processing or treatment of that particular animal in accordance with preestablished criteria.

In general, the present system comprises the use of a stall with a water bowl at one end and an entrance opening at the other end whereby an animal will enter the stall to drink. An entrance gate is automatically operable from a normally open position to a closed position to confine the animal in the stall upon generation of a gate closing signal. An exit gate located at the water bowl end of the stall is automatically operable from a normally closed position to an open position upon receipt of a gate opening signal to provide an exit from the stall to a retaining pen adjacent the stall. In this manner, selected individual animals of a group of animals that normally water in the stall at various times on a random basis may be selectively directed into the retaining pen for any of a variety of reasons.

In order to enable selection of particular animals for retention in the retaining pen, an animal identification system must be utilized. In the presently preferred embodiment of the invention as designed for use with cattle in a feedlot or on a ranch or a farm, the identification system comprises an ear tag which is attached to one ear of each animal in the group of animals. Each ear tag has a visible different identification number thereon so that each particular animal may be visually identified from the other animals. In addition, each ear tag has an electronic signal generating device which is operable to generate a coded identification signal different from any coded identification signal generated by any other device on any other animal. An electronic signal receiving device is mounted in juxtaposition to each water bowl in each stall to receive the coded identification signal whenever an animal is watering in the stall so as to enable identification of each animal in any stall.

A computer means is employed to determine and select which of the animals is to be directed to the retaining pen and which of the animals is to be permitted to return to the group of animals outside the retaining pen. The signal generating means in the stall is suitably connected to the computer means to communicate a unique animal identification signal to the computer means which signal identifies a particular animal in the stall. The computer means is suitably programmed to receive and store specific information relating to each particular animal in association with an unique identification code for each animal. In addition, the computer means may be programmed to receive and store general information about the animals, environmental information and the like. The computer means is suitably programmed to compute and correlate specific information about a particular animal with general information or compilations of specific information about the animal to enable selection decisions to be made automatically about each particular animal. Selection decisions may also be made by a computer operator by manual entry of data to the computer means. The computer means is programmed to send animal selection signals to gate operating means associated with the entrance gate and the exit gate of each stall. Thus, when a selection signal is generated in the computer means and transmitted to the gate operating means when a particular selected animal is in a stall, the entrance gate is closed to hold the selected animal in the stall and the exit gate is opened to direct the selected animal to the retaining pen.

The foregoing animal identification and selection system may be used in conjunction with a multiplicity of animal management procedures. For example, the computer means may be programmed to automatically generate a selection signal at the end of predetermined periods of time to enable the selected animal to receive medical treatment such as periodic innoculations or to receive a special feed ration, or to be bred during a fertility period or to be isolated for calving or to be shipped to a feedlot or to be slaughtered or to be offered for sale or the like. Of course, any of the foregoing decisions can be made separately from the computer and inputed by the computer operator. The time of day of watering of a particular animal and the amount of water drunk by the animal can be recorded in the computer. Irregularity of appearance or the failure of an animal to enter a stall for water for a period of time can be recorded in the computer. The computer can be programmed to generate period (daily, weekly, etc.) information sheets about each animal for the use of management personnel and to generate alarm signals relating to particular animals.

In addition to recording and generating information about presence of an animal in a stall for the purpose of selective separation from the group of animals, another feature of the present invention is the capability of measurement of a selected physical characteristic of a particular animal or treatment of a particular animal while the particular animal is in a stall. For example, the weight of the animal may be measured while the animal is in a stall by platform-type weighing means and a weight signal may be generated and transmitted to the computer means. Thus, the gain or loss of weight of each particular animal may be recorded on a daily basis and animal management decisions made automatically by the computer means or manually through the computer means. Medicinal treatment may be effected when an animal is in a stall by injection of medicine into the water bowl or special feed treatment may be effected by providing a supply of a special feed ration while the animal is in the stall.

This invention is particularly useful for monitoring the condition of cattle in a feedlot environment where cattle are being fed and watered to increase weight prior to slaughter. In operation of typical cattle feedlots, a multitude of animals are confined in one or more relatively large-size pen areas. Some feedlots contain as many as 30,000 to 100,000 or more animals at any one time. In general, each pen area is enclosed by suitable fencing. A supply of feed and a supply of water are provided in each pen area. The present invention may be advantageously utilized by providing the water supply in water bowls in a group of stalls located in each of the feedlot pen areas adjacent a section of the pen area fence so that the retaining pen may be located between the stalls and the pen area section of fence. The computer means includes a central large-size computer located in a building structure at the feedlot and a small-size microprocessor-type computer located on site at each of the group of stalls in each of the feedlot pen areas.

Evidence indicates that cattle have definite patterns of growth and weight gain characteristics. Thus, it is possible to determine when it is no longer profitable to continue to hold and feed a particular animal in a feedlot environment. In addition, some cattle in a feedlot may also become ill and it is desirable to identify such animals for treatment and/or removal from the herd. It is to be understood that the advantages of this invention may be employed with all kinds of domestic and wildlife animals and may be used in other environments such as on farms, ranches and game preserves.

In general, the presently preferred cattle feedlot embodiment of the invention comprises one or more relatively large size pen means for generally confining a large group of the animals and relatively small size pen means within or associated with the large size pen means for selectively confining a smaller group of the animals selected from the larger group of the animals. Individual stall means are provided in the large pen area for receiving only one animal at a time including an entrance gate means and an exit gate means for restricting entry and exit of the animals relative to the stall means. An animal attraction means, such as a feeding and/or watering bowl or trough, is provided in each stall means for supplying feed and/or water to an animal located in the stall means. The terms feeding and watering are intended to be equivalent unless otherwise stated. A conventional electronic platform-type weighing means is located in each stall means in a position and arrangement whereby the weight of the animal is supported by the weighing means when the animal is feeding or watering while located in the stall means. Animal identification signal generating means are attached to each animal for generating a unique coded identification signal for each animal in order to identify the particular one of the animals in the stall means. Animal identification signal receiving means are mounted in juxtaposition to the feeding or watering means in each stall means for receiving the unique coded identification signal transmitted from the animal identification signal generating means and for transmitting a corresponding process identifying signal unique to the particular one of the animals. Electronic computer type correlating/comparator means are provided for correlating the identification signal and the weight signal for each animal with predetermined weight criteria. If the weight of the animal meets predetermined weight criteria, an electronic control signal is generated for selective separation of the animal from the other animals. Exitway means are provided between the relatively small-size retaining pen means for receiving each selected individual animal from the stall means. Selectively automatically operable gate means are provided for selectively controlling movement of each animal from the stall means to either of the relatively large size pen means or the relatively small-size retaining pen means. A first control means is operable for opening the entry gate means and closing the exit gate means of the stall means to enable an animal to enter or exit the entry gate means and for selectively closing the entry gate means after an animal has entered the stall means. When an animal has entered the stall means, it is supported by the weighing means while feeding from the feeding means. A second control means is operable for opening the exit gate means after the entry gate means has been closed when the animal located in the stall means has been identified by the identification means and a retain signal has been generated; and for thereafter closing the exit gate means and opening the entry gate means to permit entry of another animal. In one embodiment, a third control means may be provided to selectively open and close additional selection gate means whereby the identified and weighed animal from the stall means is selectively moved to the relatively large size pen means or the relatively small-size pen means.

BRIEF DESCRIPTION OF DRAWINGS

The apparatus and methods of illustrative embodiments of the invention are shown in the accompanying drawings wherein:

FIG. 9 is an enlarged schematic plan view of a portion of the apparatus of FIG. 8;

DETAILED DESCRIPTION

Figure 1:
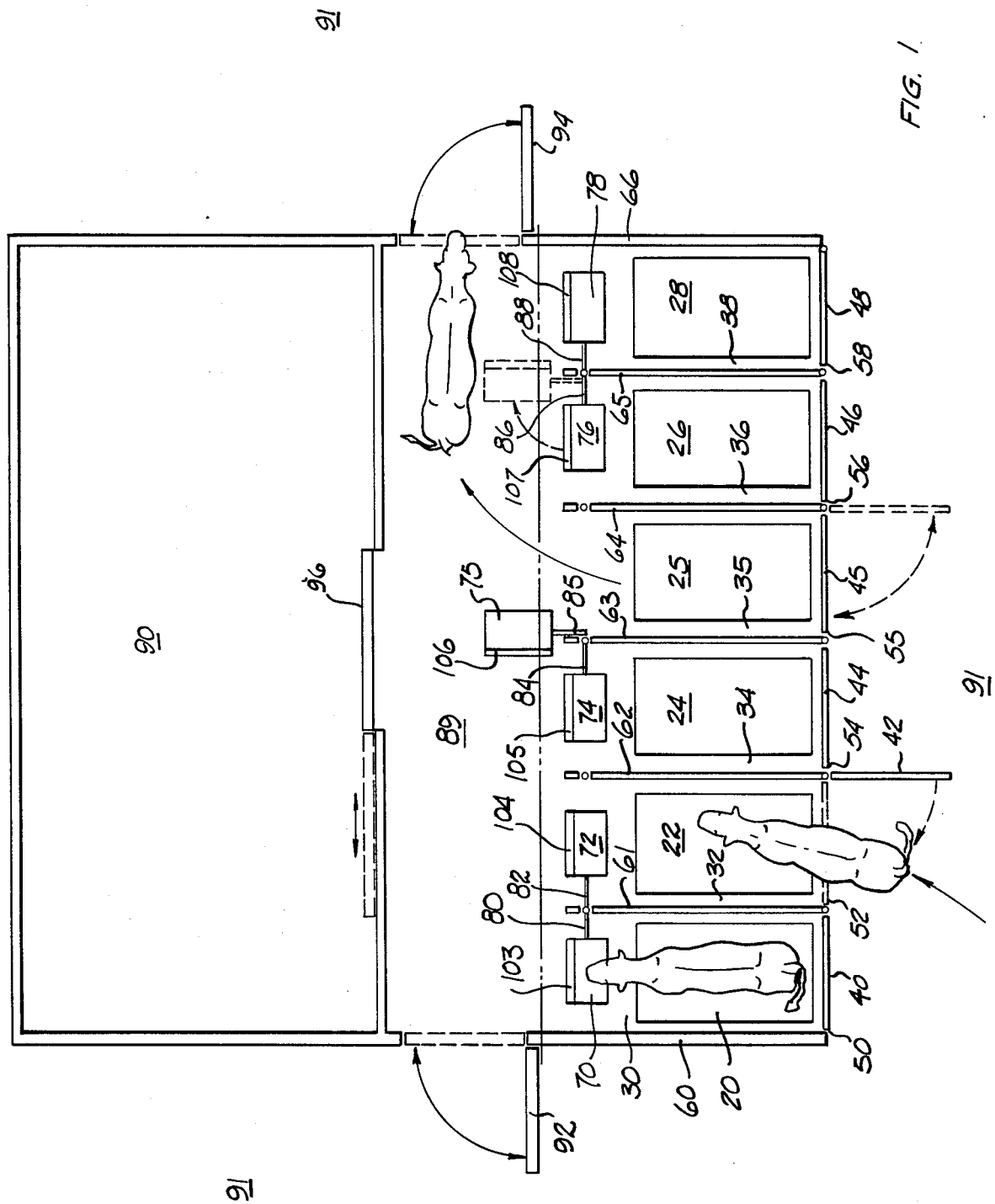
FIG. 1 is a schematic plan view of one illustrative arrangement of apparatus for practicing the invention.

In general, a first illustrative embodiment of the system shown in FIGS. 1-6 comprises a plurality of platform type electronic weighing scale means 20, 22, 24, 25, 26, 28 located in separate stall spaces 30, 32, 34, 35, 36, 38 having automatic electronically operable and closeable entry gate means 40, 42, 44, 45, 46, 48 for entrance openings 50, 52, 54, 55, 56, 58 at the entry end of each of the stall spaces which are defined by spaced parallel sidewall or rail means 60, 61, 62, 63, 64, 65, 66. A feed and/or water bowl means 70, 72, 74, 75, 76, 78 is mounted at the exit end of each stall on automatic electronically operable openable and closeable exit gate means 80, 82, 84, 85, 86, 88. Entry gate means 40-48 are normally open, as indicated by gate 42, and exit gate means 80-88 are normally closed so that an animal will enter a stall to obtain attraction means such as water. After an animal enters a stall and is in position to drink, as shown in stall 30, the associated one of entry gate means 40-48 may be closed. After an animal in a closed stall has been identified and weighed as hereinafter described, the associated one of the exit gate means 80-88 is opened as shown by gate 85 to enable the animal to exit the stall. An exitway or pen means area 89 is located opposite the stall exits. Selectively openable and closeable control gate means 92, 94, 96 enable selected animals to be directed to a holding pen means 90 while other animals are directed back into the general herd population kept in an enclosed feedlot or pasture area 91.

Figure 2:
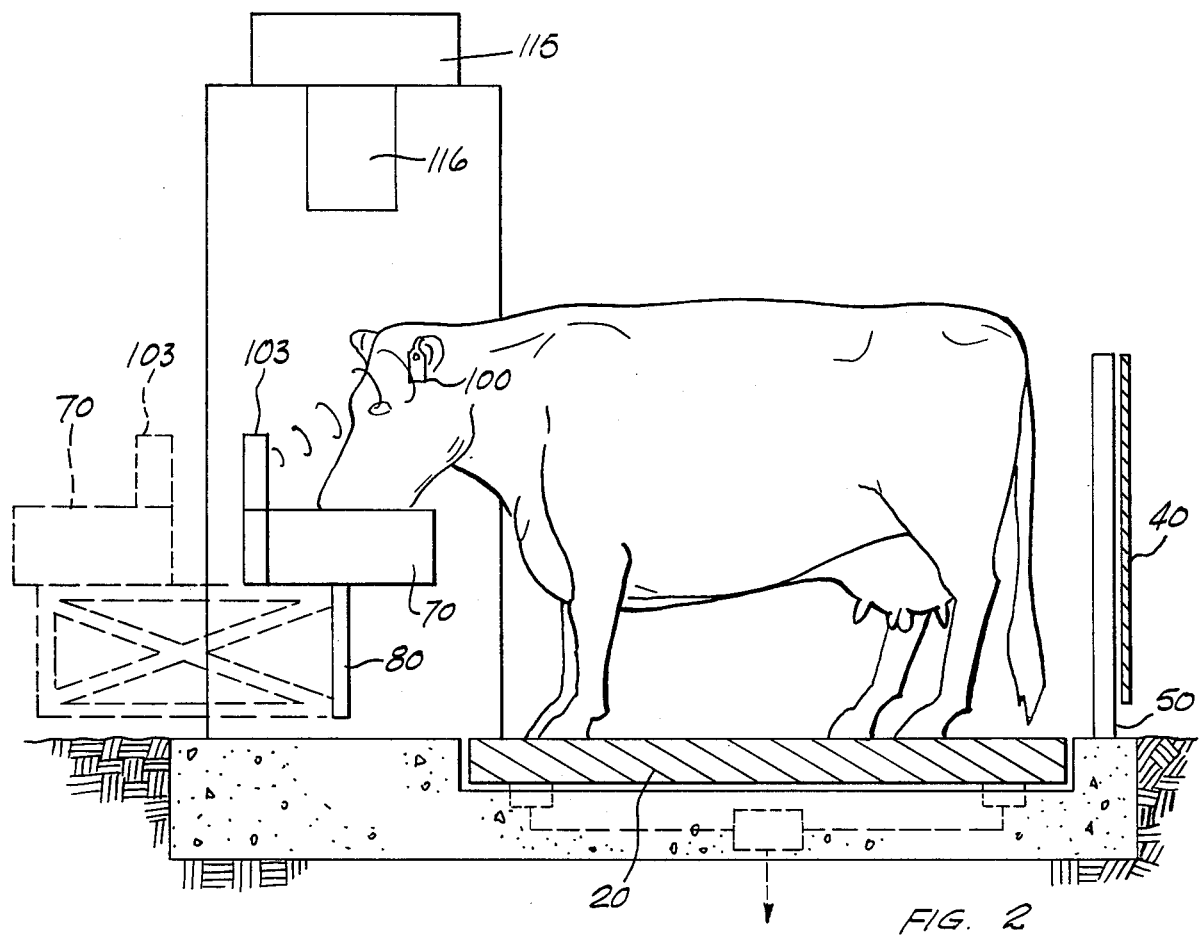
FIG. 2 is an enlarged schematic side elevational view of a portion of the apparatus of FIG. 1.
Figure 3:
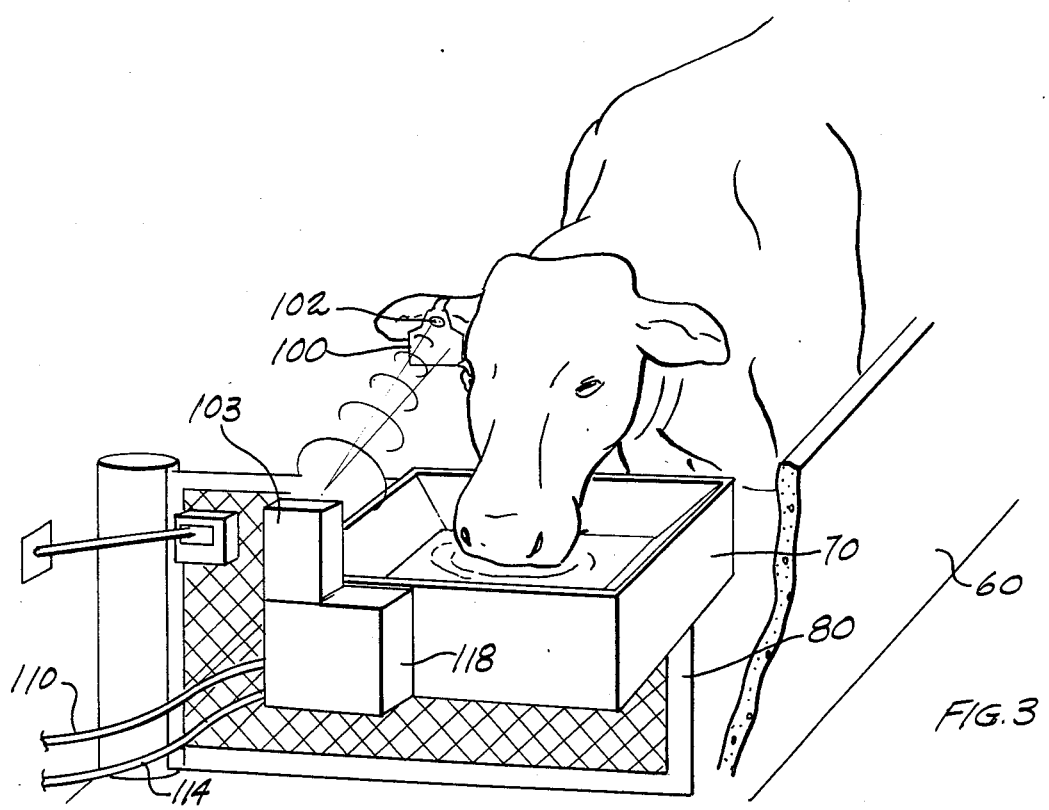
FIG. 3 is a schematic perspective view of the apparatus of claim 2.

As shown in FIGS. 2 and 3, an identification tag means, preferably an ear tag device 100, is attached to each animal in the feedlot or pasture area 91. Each ear tag device includes an identification signal transmitting means 102 which is capable of generating a unique coded identification signal so that each animal may be separately identified. Identification signal receiving means 103, 104, 105, 106, 107, 108, FIG. 1, are mounted on or in juxtaposition to each of the bowl means so that when an animal places its head in proximity thereto, such as when feeding or drinking therefrom, a unique coded identification signal is generated which identifies the particular animal in the associated stall. Each of the identification signal generating means are connected by suitable cable means 110, FIG. 3, to a power supply and associated electronic data processing apparatus as hereinafter described.

The construction and arrangement is such that the animal must stand on the associated scale means in order to reach and to drink from the bowl means while the animal is in the stall means. Furthermore, the size of the stall means is approximately equal to the size of the animals so that freedom of movement of an animal is restricted after the animal enters the stall whereupon an entry gate control signal may be generated to cause the associated one of gate means 40-48 to move to the closed position. In another embodiment of the invention, the animal may enter and exit the stall through the same entryway until a select signal has been generated as hereinafter described. After the animal is in position in the stall and the identification signal has been generated by the associated one of the signal receiving means 103-108, a weight signal is generated by the associated one of the scale means 20-28 and electronically processed in conjunction with the unique coded identification signal of the particular animal. After a predetermined time sufficient to enable the animal to finish drinking from the bowl means or upon occurrence of a predetermined condition relating to the amount of water in the bowl means, an electronic control signal is generated to cause the associated exit gate means 80-88 to be moved to the gate open position whereupon the animal will move into the control chute or pen means 89. If the animal exiting the stall is to be returned to the general herd population, return gate means 92, 94 are opened and retaining gate means 96 is closed. If the animal is to be separated from the general herd population, the return gate means 92, 94 are closed and the retaining gate means 96 are opened to provide an exit path enabling the animal to only enter the retaining pen means 90. After the animal exits the stall, the stall exit gate means is closed and the stall entrance gate means is opened to enable another animal to enter the stall. The bowl means may be kept full of water automatically by suitable float valve means (not shown) connected to a supply of water through suitable hose means 114 (FIG. 3) or the bowl means may be supplied with a feed ration through suitable overhead conveyor means 115 (FIG. 2) and associated feed ration dispensing means 116. In addition, medicinal supply means 118, FIG. 3, may be provided to provide medicine to either water or feed in the bowl means.

Identification Means

Figure 4:
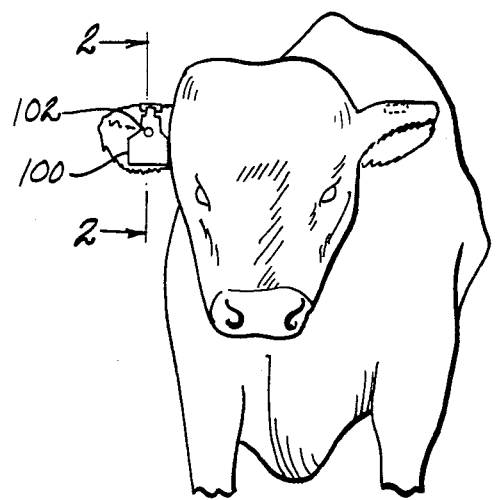
FIG. 4 is a front view of an animal with an ear tag type identification device.
Figure 5:
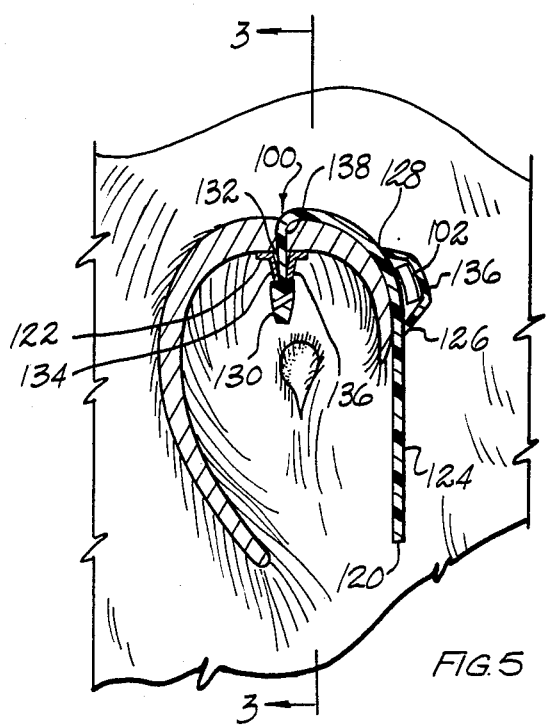
FIG. 5 is an enlarged cross-sectional side view of the animal ear and ear tag device.
Figure 6:
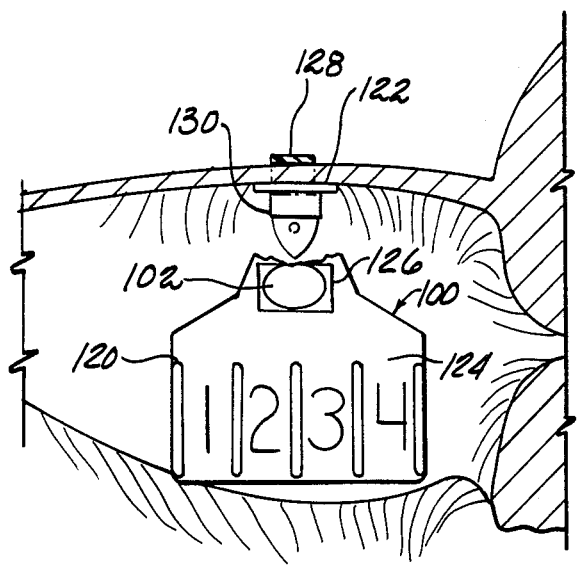
FIG. 6 is an enlarged front view of the animal ear and ear tag device.

As shown in FIGS. 4-6, the presently preferred ear type identification tag means 100 comprises a tag member 120 made of one piece of molded flexible plastic material and a retaining button member 122 made of one piece of relatively rigid molded plastic material. Tag member 120 has a relatively large body portion 124, an intermediate tapered portion 126, a support strap portion 128 and a retaining head portion 130. Retaining button member 122 has a central slot 132 and resilient spring finger portions 134, 136. In use, a slit 138 is cut in the top of the animal ear and head portion 130 is forced through the slit and then through the central slot 132 in button member 122. Thereafter, the head portion is retained by the button member to hold the tag member in the illustrated position hanging downward in front of the animal ear. Signal transmitting means 102 is suitably fixedly mounted on tag portion 126 by integral molding therewithin or placement in a pouch 136, FIG. 5. A tag means of this type is disclosed in my copending application for MULTIPLE PURPOSE ANIMAL EAR TAG SYSTEM filed herewith, the disclosure of which is incorporated herein by reference.

As shown in FIG. 6, body portion 124 is provided with suitable visual numeric identification indicia. After slaughter of an animal, the identification tag assembly may be removed from the ear and kept on or with the carcass to enable automatic monitoring of a particular animal and generation and storage of grade and quality information. In addition, other types of ear tag assemblies may be utilized such as described in my prior U.S. Pat., Nos. 3,896,577, 3,958,353 and 4,102,073.

In one presently proposed embodiment of the invention, the identification signal generating means 102 on the ear tag is a conventional electronic chip device with conventional miniaturized electronic circuitry and an antenna which is capable of receiving activating electromagnetic energy and responding thereto by emitting a coded radio frequency digital signal. The identification signal receiving means is a conventional device which generates electromagnetic energy for actuating the identification signal generating means and which is capable of receiving, decoding, transmitting an analog signal. Both the identification signal generating means and the identification signal receiving and transmitting means may be of the same general design as apparatus currently manufactured and sold by B.I. Corporation of Boulder, Colo., and disclosed in U.S. Pat. No. 4,475,481, the disclosure of which is incorporated herein by reference; but may also be other designs including the type wherein the signal generating means is battery operated and does not depend on receipt of activating energy from the signal receiving means. The identification signal receiving means 103-108 activates the ear tag signal generating means 102 by transmitting an electromagnetic field burst of fixed duration. The signal generating means 102 acquires energy from the field and responds by transmitting back to the generating means a radio frequency digital coded message signal which contains the unique number programmed into the electronic chip device. The generating means receives the coded signal and conditions it into a data signal that can be sent to electronic data processing means.

Data Processing & Control System

Figure 7:
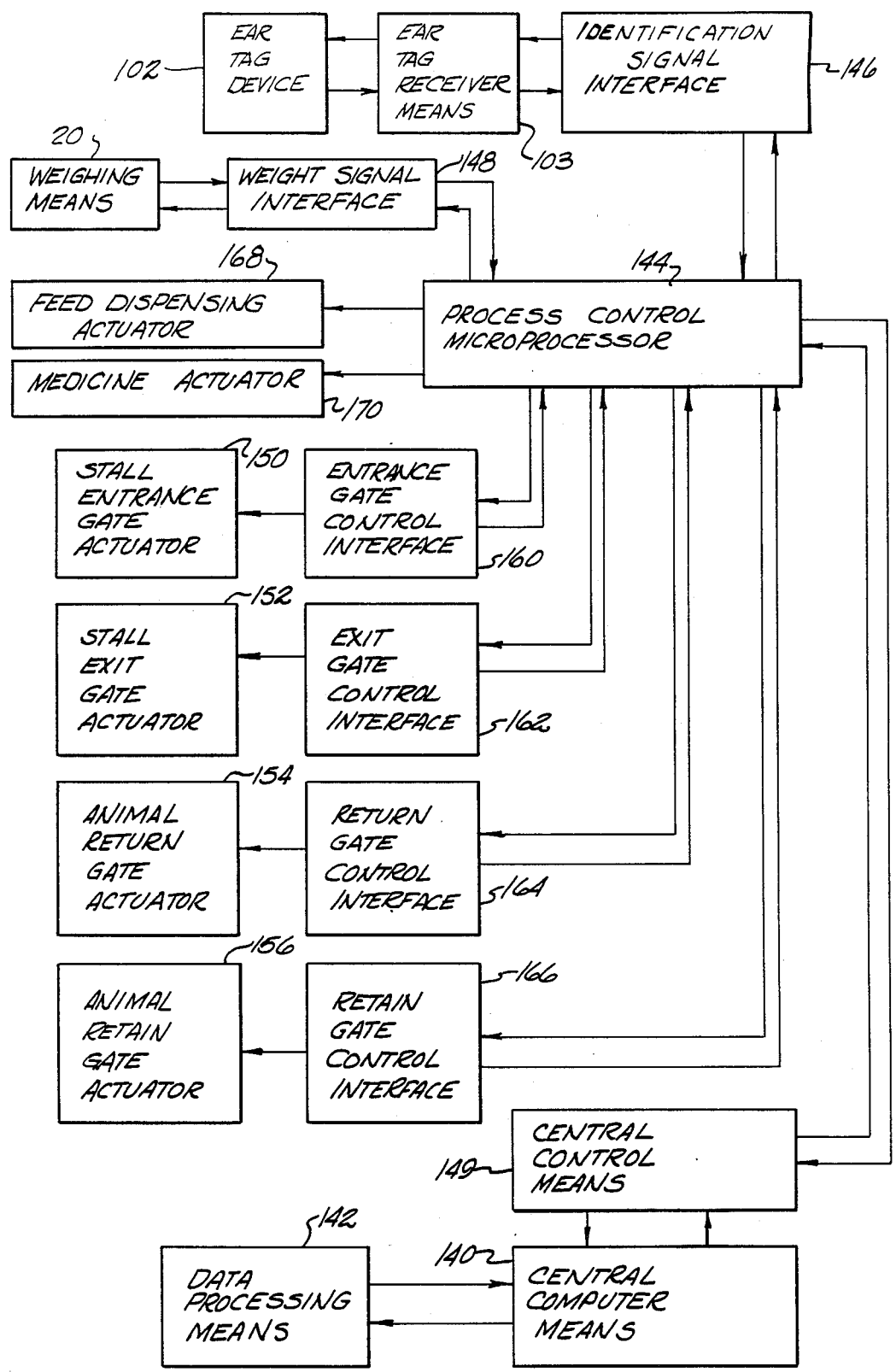
FIG. 7 is a schematic block diagram of some of the apparatus and associated electronic control system components.
Figure 8:
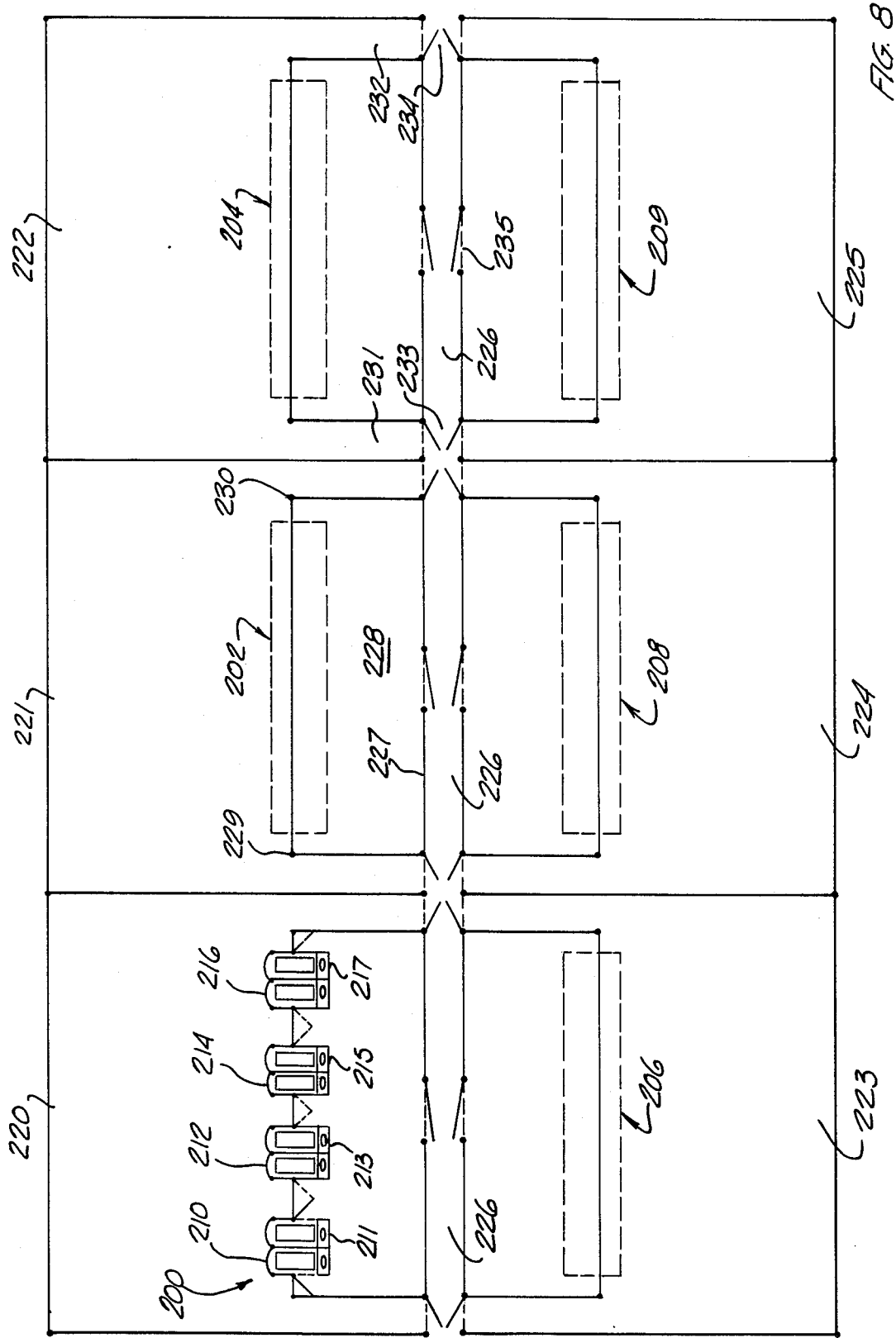
FIG. 8 is a schematic plan view of another illustrative arrangement of apparatus for practicing the invention.

An exemplary data processing and control system is shown in FIG. 7 to comprise a central computer means 140 which is capable of receiving electronic animal identification signals and animal weight signals; storing and comparing animal identification, weight and other animal related information; and receiving and generating appropriate system control signals. Computer means 140 is located in a building or other environmentally controlled structure and may be connected to one or more multiple-stall feed-watering-weighing stations as well as to other data processing and storage devices 142. Each multiple-stall feed-watering-weighing station, such as shown in FIG. 1, includes a process control microprocessor unit 144 for receiving animal identification signals from the identification signal means 103–108 associated with each bowl means in each stall through an interface means 146 and weight signals from the weighing means 20–28 associated with each stall through an interface means 148. The microprocessor unit may be used to store and/or record the identification number and the weight of the individual animals and transmit the information to the computer means 140 which is connected to the microprocessor unit through a central control means 149 to receive and send information and control signals therebetween. Each of the gate means is operable by gate actuator means 150, 152, 154, 156, 158 in response to control signals received through control interface means 160, 162, 164, 166 from process control microprocessor means 144. In addition, any auxiliary mechanisms such as feed dispensing means or medicine dispensing means are operable by actuator means 168, 170 in response to control signals received from process control microprocessor means 144. It is to be understood that various control and data processing apparatus, including related circuitry and software, may be modified and varied as necessary or desirable to achieve the desired results or variations thereof.

In the exemplary data processing and control system, analog signals representative of animal weight are transmitted from conventional electronic weighing means 20 to interface means 148 for conversion into a digital weight signal representing the weight of the animal. The digital weight signals are transmitted from interface means 148 to process control microprocessor means 144 for transmission to the computer means 140 through central control means 149. The process control microprocessor may receive and store identification and weight data for a period of time and then transfer the data to the computer via the central control unit which converts the data signals to a high level protocol suitable for communication with the computer.

The system may be arranged so that an animal is not separated from the general herd population until after a sufficient period of time to enable processing of the last recorded weight data. For example, the weight data obtained during the confinement of an animal in a stall may be stored by the process control microprocessor or the central control means for a period of time, e.g., 6 to 12 hours, before being transmitted to the computer means. In this situation, the animal is allowed to return to the general herd population after an identification and weighing process is completed. After the prior acquired weight and identification information is transmitted to the computer means, and appropriate calculations and comparisons have been made by the computer means, the computer means transmits an animal hold signal to the process control microprocessor which may be stored in the microprocessor. Then, the next time the animal enters a stall and is identified, the prior generated animal hold signal will become effective to initiate the separation process for that particular animal.

The control system may further include microswitches and/or photoelectric eye means associated with the various entrance and exit gate means to indicate the passage of animals and closing or opening of the gate means. Displays and printouts associated with the computer means or the process control microprocessor means may provide operators with specific information about specific animals which have been separated from the general herd population as well as specific information about specific animals still in the general herd population.

As previously described, tne animal identification signal transmitting means 102 is a passive (no battery) electronic device encased in plastic that receives and stores energy from a surrounding receiving electromagnetic field generated by the identification signal means and transmits an unique digital code to the signal receiving means. The transmitting means 102–108 is of relatively small size, e.g., approximately 15 to 25 mm × 15 to 25 mm × 3 to 5 mm, or less, and of relatively low weight, e.g., 5 to 10 grams. The range of transmission of both the transmitting means and the receiving means is preferably limited to approximately between six inches to 3 feet, and the storage capacity is approximately at least twenty to thirty binary digits (bits) of data plus other digits for preamble and parity (error detection) so that the system allows for up to 1,000,000 or more different unique codes which may be programmed into the electronic chip during manufacture. Both the transmission means and the receiving means are adapted to operate under severe environmental conditions, e.g., temperatures from $-30°$ C. to $+55°$ C. ambient outdoor temperature ($-22°$ F. to $131°$ F.) while not being affected by continued exposure to 10% to 100% relative humidity or sprayed or condensed water and are preferably fully encapsulated and will not be damaged by vibration or impact during shipment or use. The operating frequency should be between 100 KHz and 500 KHz and approved for use by the FCC in the United States and the CSA in Canada.

The identification signal activating and receiving means 103 is an electronic device mounted on or adjacent to the watering bowl. Means 103 transmits electromagnetic energy which powers the ear tag transmitter means and receives the radio frequency digital encoded signal therefrom. The actuating and receiving means conditions the identification signal for transmission to the process control microprocessor and may include an interface means for connection to the scale interface and circuitry to condition the scale output signal for transmission to the microprocessor means. Means 103 may be further constructed and arranged to receive a command from the microprocessor to sort the animal and to send a signal to the control interface means which may be integrated into the identification means for actuating the gate mechanisms. The identification means 103 may be provided with the capability of detecting when an animal is drinking and being weighed, but not transmitting an identification code, a condition that indicates a malfunction in the transmitter or a lost tag, so that the animal may be sorted and/or an alarm message may be sent to the microprocessor. Preferably, the identification means is packaged in a waterproof, sealed plastic or stainless steel case and is operable by 110 volts A.C., one amp capacity, from a switch box at or adjacent the watering bowl. The range is such as to activate and read the tag transmitter means while the animal is drinking and should be between approximately 6 inches to 3 feet so as not to activate nor read the tag of an animal at an adjacent water bowl.

Each of the scale means includes conventional electronic apparatus and circuitry for measuring animal weight and generating weight signals. The scale interface means 148 is an electronic device that receives weight signals from the scale means and conditions the signals for transmission to the microprocessor over the communication bus whereby particular weight signals are associated with the identification signal of each animal being weighed. This device may be integrated into the identification means 102. The microprocessor means 144 is a microprocessor-based electronic device that contains the circuitry and memory to communicate with the identification means and weighing means and store one weight for each animal for each stall confinement for one period of time. The weight recorded may be the beginning, ending or average weight recorded. The microprocessor means also communicates with the computer means via the central control means as programmed or as requested, and is able to download all data records to the computer means. In addition, the computer means is able to send data to the microprocessor to update the animal records or to instruct it to initiate animal separation via the identification means.

The microprocessor control means may have the added functions of being a local monitor of each group of stalls by inclusion of a keyboard and display allowing the operator to gain access to and add data stored in the microprocessor at the stall site. Such data could include the weight of each animal, the date each animal was put into the pen, the total number of animals in the pen, and a list of the animals sorted for yesterday or so far today and the reason for the sort. The microprocessor means may also provide a report of exception animals, indicating animals that should be in the pen but are not being identified. Such a report would help the operator locate animals with lost or defective tags.

The microprocessor means may also perform fault detection of the system in the stall area by receiving information on non-operating scales, an animal being weighed but not identified indicating a lost or malfunctioning tag transmitter and malfunctioning of the identification means. If any malfunctions occur, a light on the microprocessor will be lit. When an operator checks the microprocessor, he can, via the keyboard, request that the malfunction conditions be displayed. He can then take appropriate action to correct the reported malfunction. In addition, the microprocessor will transfer all such information to the central control means or the computer means to provide for central monitoring of malfunctions. The microprocessor may be packaged in a stainless steel or other non-corroding weathertight sealed enclosure and/or placed in a building structure. The electronic components are conformal coated and all electrical connections to power or communication cables are through sealed conduit connections. The microprocessor may have an externally accessible sealed membrane-type keyboard and be operable at 110 volts A.C., five amp capacity, through a fused switch box with suitable filtering means to suppress line noise and transients. Such a microprocessor will poll the status of all weigh/identification stations in less than two seconds. If a sort status exists for an animal, the sort sequence will be actuated on a second poll so that the animal sort will begin no more than four seconds after the animal is identified as being at the station. The microprocessor should be designed to operate during very low and very high ambient temperatures. Heaters, internal to the enclosure, may be provided to maintain suitable temperature for the electronic components and sealed to prevent ingress of moisture so that operation will not be affected by rainfall, spraying or continued exposure to relatively high humidity.

The central control means serves as an interface between the control microprocessor units and the central computer. The central control means accepts communication signals from the central computer and converts the data format into one suitable for transmission over the communication lines to the microprocessor means. Signals coming to the central computer from the microprocessor units are received by the central control means and are converted to signals the central computer can accept. The central control means also buffers signals from the microprocessor units by insuring the central computer is on line and ready to receive before allowing data to be transmitted. The central control means will communicate to the microprocessor units in such a way that the data traffic on the communication lines is managed and microprocessor communications do not interfere with one another. The central control means provides filtering so that noise or power spikes coming in on the communication lines are not transmitted to the central computer. The central control means may also serve as a local system monitor. If communication is lost with any microprocessor unit, it will light an alarm light and the display will indicate the nature of the malfunction. The status of each microprocessor and all data available at the microprocessor can also be requested and viewed at the central computer means. The central control unit may be packaged in a shielded plastic computer terminal box, have a sealed membrane keyboard, and be operable by 110 volts A.C. with a dedicated 15 amp circuit with a capacity for controlling from one to five hundred microprocessor control units to provide a relatively large total system capacity, e.g., 300,000 or more animals. The central control means is located in a temperature and humidity controlled environment suitable for computer use, i.e., 0° to 40° C. (30° to 104° F.); ten percent to ninety percent relative humidity).

The control interface, which may be integrated into the identification unit, is an electronic device that receives a signal when a sort of an animal being weighed is to occur. When this signal is received, the control interface switches power to an actuator, whether electrical, air or hydraulic, and starts the sort sequence. The control interface also monitors switches or other feedback mechanisms on the mechanical hardware to detect and signal the microprocessor when jamming or malfunctions occur.

The central computer is preferably a hard disc, real time, multi-tasking computer with suitable software for two-way communication with the central control means and proper data transfer therebetween.

When a particular ear tag 100 having an identification signal transmitting means 102 with a particular unique code is applied to the ear of an animal, all useful information about that animal may be recorded and entered into the central computer means in association with the particular unique code. Such information may include age, breed, initial weight, general health, source, and date of entry into the feedlot. In addition, the central computer means may be provided with suitable data bases indicating average weight increase, maximum expected weight increase and length of time and amount and cost of feed for weight increase for animals of particular age, condition, breed, etc. Thus, the computer can be programmed to select a particular animal for slaughter or for resale at the most appropriate and profitable time. As weight information is generated during the feedlot feeding process, the information may be continuously stored in the computer means and used to generate data showing such matters as total weight increase, daily weight increase and the like. Such data can be compared and correlated with standard models included in the computer data base. The selection of animals may be controlled automatically by computer generated information or by review of the information by an operator.

FIGS. 8-11 show another illustrative and presently preferred embodiment of the invention wherein separate groups 200, 202, 204, 206, 208, 209 of stalls 210, 211, 212, 213, 214, 215, 216, 217 are separately located in large-size fenced feedlot-type pen means 220, 221, 222, 223, 224, 225 which may be arranged in parallel rows with a central passageway 226 therebetween. Each group of stall means is spaced from a section of fence 227 of the associated pen means to provide a retaining pen means 228 defined by fence sections 229, 230 while also providing passageways 231, 232 connected to central passageway 226 by suitable gate means 233, 234. Each retaining pen means 228 is connected to central passageway 226 by suitable gate means 235.

As shown in FIG. 9, each group 200 of stall means is constructed and arranged in adjacent stall pairs 210 & 211, 212 & 213, 214 & 215, 216 & 217. Each stall of a pair of stalls has an entryway means 240, 241 with an associated entrance gate means 242, 243, an exitway means 244, 245 with an associated exit gate means 246, 247, a platform type scale means 248, 249, and a water bowl means 250, 251 reachable by an animal only from within the stall means. Entrance gate means 242, 243 are normally open so that cattle may freely enter any one of the stall means to obtain water from associated watering bowl means 250, 251 which may be the only source of water in the pen means 220. In order to obtain water, each animal must fully enter one of the stall means and stand on the associated scale means 248, 249. Exit gate means 244 & 245 are normally closed so that each animal must back out of the stall means after drinking water therein. When an animal has been selected for separation from the general herd population in main pen means 220 and after the selected animal enters a stall means, the associated entrance gate means is closed and the associated exit gate means is opened whereby the only exit from the stall means is into the retaining pen means 228. After the selected animal exits the stall means into the retaining pen means, the associated entrance gate is opened and the associated exit gate is closed. Fence sections 255, 256 close off spaces adjacent the stall means so that the selected animals cannot escape from retaining pen means 228 except through gate means 235 which is normally closed until selectively opened by a feedlot operator for the purpose of removing a particular animal or group of animals which are visually identifiable by the numbers on their ear tags.

Figure 10:
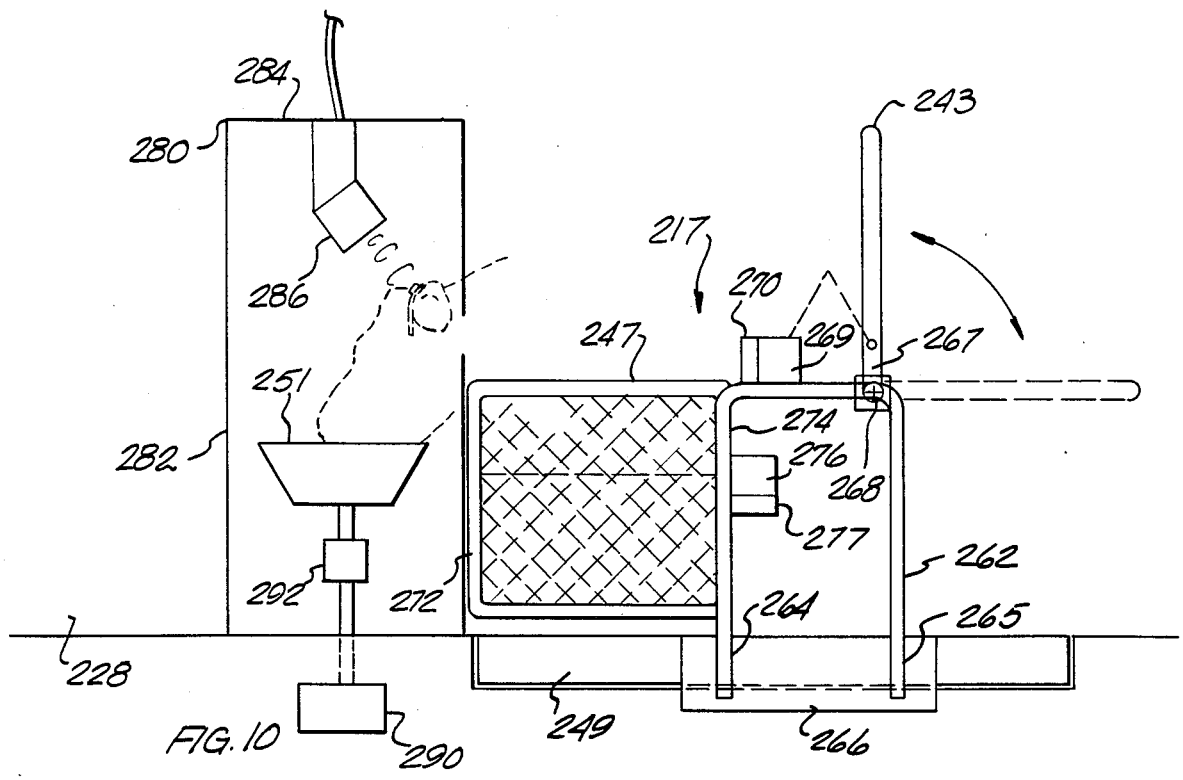
FIG. 10 is an enlarged side elevational view of a stall of the type illustrated in FIGS. 8 and 9.

A presently preferred construction for the stall means comprises a relatively long length fixed common dividing wall means 260, FIG. 9, and relatively short-length fixed opposite side wall means 261, 262, made from a length of metallic pipe material or the like with leg portions 264, 265 (FIG. 10) fixedly embedded in a concrete pad 266 alongside of the scale means. Each entry gate means 243 comprises a length of pipe or the like bent into a curved U-shape configuration with end portions 267 pivotally mounted on side rail pipe means 261, 262 by suitable bracket means 268 for movement from a vertical position to a generally horizontal position as shown in FIG. 10. An exit gate actuator means 269 and control means 270 are suitably mounted on rail means 262. Each gate means may comprise a U-shape pipe frame 272 pivotally mounted on fixed rail leg portion 274. An exit gate actuator means 276 and control means 277 may be mounted on fixed leg portion 274. Water bowl means 250, 251 are mounted in an enclosure 280 having a side wall 282 preventing access to the water bowl from the retaining pen 228 and a top wall 284 for mounting of the identification signal receiving means 286, 288, FIG. 11. Water bowl means 251 may be connected to a water source 290 through a float type control valve means 292.

Figure 11:
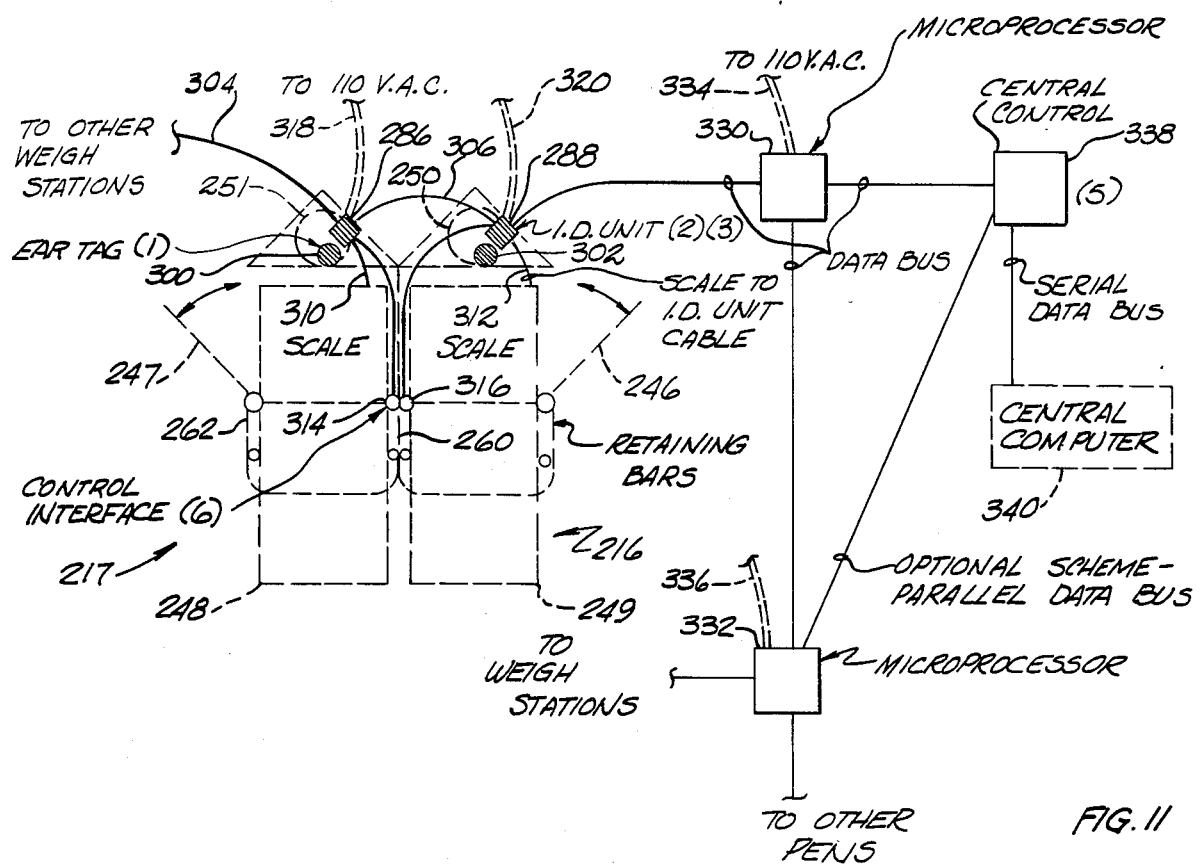
FIG. 11 is a schematic plan view of the stall apparatus of FIG. 10 and associated identification and control apparatus.

FIG. 11 is a schematic representation of a pair of the aforedescribed stall means 216, 217 with scale means 248, 249, exit gate means 246, 247, water bowl means 250, 251, gate control means and identification signal receiving means 286, 288. Identification signal transmitting means on an animal ear tag are illustrated at 300, 302. The identification signal receiving means are packaged with microprocessor means and suitable interface means as previously described and adjacent packages are interconnected by suitable transmission cable means 304, 306.

Each interface unit is connected to an output cable 310, 312 from the associated scale means; control interface devices 314, 316 which operate the gate means; 110 volt A.C. power supply cables 318, 320; and microprocessor control units 330, 332 operated by 110 volt A.C. power through cables 334, 336. The microprocessor control units are connected in series or in parallel to central control means 338 which is connected to central computer means 340. The electronic and control devices of the system operate as previously described with reference to FIG. 7.

The aforedescribed apparatus of FIGS. 1-11 discloses an animal identification and control system for identifying each particular animal among a group of animals and for selectively separating a particular animal from the group of animals comprising stall means having an entryway means and an exitway means for enabling entry and confinement of one animal at a time. A pen means is associated with the stall means for receiving selected ones of the group of animals from the exitway means. A gate means is associated with the stall means and is movable between an open position and a closed position for enabling an animal to exit the stall means only through the exitway means to the pen means. A gate actuating means is operably associated with the gate means for causing movement of the gate means between the open position and the closed position. An identification signal-sending means is attached to each animal for generating an unique coded signal identifying only that particular animal. An identification signal receiving means is mounted in the stall means for receiving the unique coded signal from the identification signal generating means only when an animal is located in the stall means and for generating a corresponding unique identification signal. An animal selection control means is operably connected to the identification signal receiving means for receiving the corresponding unique identification signal from the identification signal receiving means and for selectively generating a control signal and transmitting the control signal to the gate actuating means for causing selective actuation of the gate actuating means to cause a particular animal to move from the stall means to the pen means through the exitway means.

The animal attraction means is suitably located in said stall means for causing an animal to enter said stall means and is preferably located in juxtaposition to the identification signal receiving means for locating the identification signal sending means in operable proximity to the identification signal receiving means.

The gate means comprises a first gate means which is associated with the entryway means and is operable to a closed position only when a control signal is generated by the control means for enabling non-selected animals to enter and exit the stall means through the entryway means in an open position and for preventing selected animals from exiting the stall means through the entryway in the closed position and a second gate means is associated with the exitway means and is operable to an open position only when a control signal is generated by the control means for enabling selected animals to exit the stall means only through the exitway means.

The control means comprises a computer means for storage of information relating to each animal in the group of animals and for generating control signals based upon identification of each particular animal. The computer means may comprise a microprocessor computer means associated with each group of stall means for receiving identification signals from each of said identification signal receiving means and a central computer means for receiving identification signal information signals from the microprocessor computer means and transmitting control signals to the gate actuator means.

The system may provide means for determining a current physical characteristic, such as weight of the animal, of each animal during location of that animal in a stall. Data comparing means are provided for comparing the current physical characteristic of the animal with pre-established data relating to the determined current physical characteristic. My prior filed, copending United States patent applications, Ser. No. 248,824 for ANIMAL MEASURING SYSTEM filed Mar. 30, 1981, and Ser. No. 553,438 for ANIMAL MEASURING SYSTEM filed Nov. 18, 1983, incorporated herein by reference, describe systems for evaluating the physical and genetic characteristics of animals and, more particularly, the physical and genetic characteristics of beef cattle. The present invention provides a system for identification and control of animals which is adapted to utilize animal data of the type described in the above-identified patent applications in a manner enabling a farmer, rancher, feedlot operator or the like to more efficiently and profitably control and manage animals such as beef cattle.

In one embodiment, the apparatus comprises relatively large size pen means for generally confining a large group of the animals. A relatively small-size pen means is associated with the large-size pen means for confining a smaller group of the animals selected from the larger group of the animals. Individual stall means are provided for receiving only one animal at a time including an entrance gate means and an exit gate means for restricting entry and exit of the animals relative to the stall means. Supply means in said stall means supply feed or water to the animal in the stall means. A weighing means is located in each of the stall means in a position and arrangement whereby the weight of the animal is supported by the weighing means when the animal is taking feed or water from the supply means while confined in the stall means. An animal identification signal generating means attached to the animal for generating a unique identification signal for identifying the particular one of the animals in the stall means. An animal identification signal receiving means is mounted in juxtaposition to the stall means for receiving the unique identification signal transmitted from the animal identification signal generating means and transmitting a corresponding process identifying signal unique to the particular one of the animals. A computer means is provided for correlating and comparing the process identifying signal and the weight signal for each animal and generating a control signal for selective separation of each animal from the other animals. An exitway means is located between the stall means and the relatively small size pen means for receiving selected individual animals from the stall means. A selectively operable selection gate means is associated with the exitway means for selectively directing each animal from the stall means to the relatively small size pen means.

The identification signal generating means comprises a small size electronic chip-type device, an electrical circuit and an energy receiving antenna for operation only in response to energy transmitted thereto from a separate source. The separate energy source emanates from the identification signal receiving means and is an electromagnetic energy source.

In one embodiment, the computer means makes the comparisons and correlations and generates the control signal after an animal has been identified and weighed during a first confinement procedure and the second control means is operative during the next succeeding arrival of said animal in any one of the stall means.

The invention also includes stall apparatus for receiving and controlling animals such as cattle comprising a pair of spaced side wall means defining a stall space therebetween approximately equal to the length and width of a single animal for enabling only a single animal to enter and stand in the stall space. An entryway means at one end of the stall space between the side wall means enables an animal to enter the stall space. An entry gate means selectively opens and closes the entryway means by movement between an open position and a closed position. A water bowl means or the like is located at the other end of the stall space for enabling an animal to drink only while standing in the stall space. An exitway means is located adjacent the water bowl means for enabling an animal to exit the stall space, and an exit gate means selectively opens and closes the exitway means by movement between an open and a closed position. A control means is provided for automatically opening and closing the entry gate means and the exit gate means whereby the entry gate means may be opened or closed when the exit gate means is closed and the exit gate means may be opened when the entry gate means is closed. The exitway means and the exit gate means are located in and form a part of one of the side wall means adjacent the water bowl means.

In one embodiment, the entry gate means comprises an U-shaped gate member having opposite end portions pivotally mounted on the side wall means for vertical pivotal movement between a generally vertically upwardly extending open position and a generally horizontally rearwardly extending closed position. The exit gate means comprises a laterally swinging gate member having one end pivotally mounted on one of the side wall means for lateral pivotal movement between a closed position in general longitudinal alignment with the one of the side wall means and an open position extending laterally outwardly from the one of the side wall means. Each of the side wall means is constructed of an U-shape length of pipe material having opposite end portions fixedly secured in the ground and the exit gate means and the entry gate means are also constructed of pipe material.

In addition, a platform scale means is located in the stall space for supporting and weighing the animal when the animal is drinking from the water bowl means. An animal identification signal receiving means is mounted adjacent the water bowl means for receiving an unique identification signal transmitted from an animal attached identification means while the animal is in the stall space. Gate control means are provided for operating the gate means in response to a control signal generated as a result of receipt by the signal receiving means of the unique identification signal from the animal attached identification means.

The stall apparatus may be constructed to provide an elongated row of multiple spaced side wall means defining a plurality of stall spaces. In one embodiment, the plurality of stall spaces include multiple pairs of adjacent stall spaces having a common center side wall means and separate outside side wall means. The outside side wall means of adjacent pairs of stall spaces are spaced from one another a sufficient distance to provide a common exitway means therebetween. The stall exitway means and the exit gate means of each stall are located in the outside wall means whereby animals in the stall space may exit into the common exitway means when the exit gate means is in the open position. The system of the present invention also provides methods of automatically monitoring a physical condition of a group of animals or the like and selectively directing selected animals into a retaining area by attaching an identification signal sending device to each of the animals; providing an animal attraction means at one end of a stall to cause the animals to voluntarily enter the stall on a one animal at a time basis; opening the other end of the stall to enable the animals to enter the stall; causing an identification signal to be automatically generated from said identification signalling device on the animal while the animal is in the stall; determining a condition of the animal while the animal is in the stall and automatically generating a condition signal representative of the condition of the animal; correlating the identification signal with the condition signal and automatically comparing the condition of the animal with predetermined criteria to provide a selection control signal when the animal is to be directed to the retaining area; confining the animal in a stall in response to the selection control signal; and then releasing the animal from the stall through an exitway guiding and limiting movement of the animal only to the retaining area.

In the presently preferred embodiment, the animal condition is the weight of the animal and the animal is forced to stand on a platform-type weighing means in the stall. The identification signal sending device is placed on an ear of the animal. The animal attraction means is feed or water which is placed in a bowl device. An identification signal receiving device is located in juxtaposition to the bowl device whereby the identification signal sending device is located in close proximity to the identification signal receiving device so that the identification signal is generated only when the animal is completely within the stall with its head located in close proximity to the bowl.

In one embodiment of the invention, the condition of the animal is determined during a first occasion of location in the stall and the condition signal is stored until the same animal is again identified during a second subsequent occasion of location in the stall. Then the selection control signal is utilized to selectively direct the animal to the retaining area.

It is to be understood that a selection control signal can be generated and utilized at any time by any means including manual entry at the microprocessor unit or the central computer means by a computer operator.

When the system is used to separate individual animals from a group of animals such as cattle in a feedlot in accordance with a physical condition of each animal, an ear tag is attached to each animal in the group of animals and includes an identification transmitting device capable of transmitting a unique identification code signal identifying each separate animal. The group of animals are generally confined in a relatively large pen area so that the animals are free to randomly move about within the relatively large pen area. The plurality of individual stall means with selectively openable and closeable entry gate means at one end of each of the stall means and exit gate stall means at the other end of each of the stall means and a condition sensing means in each stall means are located in the large pen area. The watering bowl means are located at the other end of each of the stall means and may be the only source of water in the large pen area. The identification signal receiving means are located in juxtaposition to each of the watering bowl means. The method includes automatically closing the exit gate means and opening the entry gate means of each stall means whenever the stall means is empty to enable random entry into each stall means through the open entry gate means of only one animal at a time; restricting movement of the animal in the stall means to a standing position with the head of the animal located adjacent the water bowl means to enable drinking with the identification transmitting device in operable relationship with said identification signal receiving means and location of the animal in operative relationship with the condition sensing means; automatically generating an animal identification signal while the animal is in the stall means; and automatically generating an animal condition signal representative of the condition of the animal while the animal is in the stall means.

The method further includes automatically correlating the identification signal and the animal condition signal and comparing the condition of the animal with pre-established condition criteria and generating control signals for further processing of the animal including an animal separation control signal when the condition of the animal meets pre-established animal condition criteria.

In the presence of the animal separation control signal an exit path leading to a small pen area is provided by actuating the automatically operable separating gate means to enable the animal to move only to the separate pen area after release from the stall means; and in the absence of the animal separation control signal, an exit path leading to the relatively large pen area is provided.

The method may further include recording and storing data representative of the time when the animal enters a stall and the time when the animal leaves a stall; recording and storing data representative of the ambient temperature at the time when the animal is in the stall; recording and storing data representative of the amount of water drunk by the animal in the stall; and periodically printing a compilation of recorded data relating to the condition of each animal.

It is to be understood that the arrangement and structure of apparatus shown in FIGS. 8-11 may be used in part or in whole with or as replacements for the arrangement and structure of corresponding apparatus shown in FIGS. 1-6. In addition, various parts of the systems illustrated and described may be used by themselves or in other combinations than those illustrated and described. Certain terminology in the description and the appended claims is equally applicable to either of the illustrative embodiments of the invention or to other alternative embodiments. It is intended that the appended claims be construed to include alternative embodiments except as limited by the prior art.

The invention claimed is:

1. An animal identification and control system for identifying each particular animal among a group of animal s and for selectively separating a particular animal from the group of animals comprising:

stall means having an entryway means and an exitway means for enabling entry and confinement of one animal at a time;

a pen means associated with said stall means for receiving selected ones of the group of animals from said exitway means;

first normally open gate means associated with said entryway means and being selectively operable to a closed position after each animal enters said stall means, and being thereafter operable to an open position only upon receipt of a control signal after the animal has exited said stall means;

second normally closed gate means associated with said exitway means and being selectively operable from a closed position to an open position while said first gate means is in said closed position only upon receipt of a control signal for enabling selected animals to exit said stall means only through said exitway means;

gate actuating means operably associated with each of said gate means for causing movement of each of said gate means between said open position and said closed position upon receipt of said control signal;

an identification signal-sending means attached to each animal for generating a unique coded signal identifying only that particular animal;

an identification signal receiving means mounted in said stall means for receiving said unique coded signal from said identification signal generating means only when an animal is located in said stall means and for generating a corresponding unique identification signal; and animal selection control means operably connected to said identification signal receiving means for receiving said corresponding unique identification signal from said identification signal receiving means and for selectively generating a control signal and transmitting said control signal to said gate actuating means for causing selective actuation of said gate actuating means to cause a particular animal to move from said stall means to said pen means through said exitway means.

2. The invention as defined in claim 1 and further comprising:

animal attraction means located in said stall means for causing an animal to enter said stall means.

3. The invention as defined in claim 2 and wherein:

said animal attraction means being located in juxtaposition to said identification signal receiving means for locating said identification signal sending means in operable proximity to said identification signal receiving means.

4. The invention as defined in claims 2 or 3 wherein:

said animal attraction means comprising a water bowl means for containing a supply of water for drinking by the animal while in said stall means.

5. The invention as defined in claim 1 and wherein said stall means comprises:

a plurality of separate stall areas arranged in side by side parallel relationship.

6. The invention as defined in claim 1 and further comprising:

third gate means between said exitway means and said pen means and being operable upon receipt of a control signal from said control means between an open position and a closed position whereby non-selected animals are returned to the group of animals and selected animals are directed to said pen means.

7. The invention as defined in claim 1 and wherein said control means comprising:

a computer means for storage of information relating to each animal in the group of animals and for generating control signals based upon identification of each particular animal.

8. The invention as defined in claim 7 and wherein said computer means comprising:

a microprocessor computer means associated with each group of stall means for receiving identification signals from each of said identification signal receiving means; and a central computer means for receiving identification signal information signals from said microprocessor computer means and transmitting control signals to said gate actuator means.

9. Apparatus for sorting of selected animals from a group of animals comprising:

stall means having an entrance gate and an exit gate for temporarily confining each of the animals on a one at a time basis;

means in said stall means for determining a current physical characteristic, such as weight of the animal, of each confined animal during the temporary confinement of that animal and for generating a data signal representative of the physical characteristic;

data comparing means for receiving the data signal and for comparing the current physical characteristic of the animal with pre-established data relating to the determined current physical characteristic and for generating gate control signals; and control means for receiving the gate control signals and for selectively actuating said entrance gate and said exit gate for selectively segregating the animal from the other animals by release of a selected animal from the temporary confinement in the stall means only through the exit gate in response to control signals generated by said data comparing means.

10. Apparatus for processing of animals such as cattle, comprising:

relatively large size pen means for generally confining a large group of the animals;

relatively small size pen means within said large size pen means for confining a smaller group of the animals selected from the larger group of the animals;

individual stall means normally freely accessible to the large group of animals for receiving only one animal at a time by choice of the animal and including a normally open entryway at one end of said stall means having a normally open automatically closable entrance gate means associated therewith for normally enabling unrestricted entry and exit of an animal into and from said stall means and for selectively automatically closing said entryway after an animal has entered said stall means to selectively prevent exit of an animal from said stall means through said entryway and including a normally closed exitway at the other and of said stall means having a normally closed automatically openable exit gate means associated therewith for normally preventing exit of the animal through said exitway and for selectively automatically opening said exitway to selectively enable exit of the animal from said stall means through said exitway;

supply means in said stall means for supplying feed or water to an animal in said stall means to cause the animal to selectively enter said stall means through said entryway;

weighing means located in said stall means in a position and arrangement whereby the weight of the animal is supported by said weighing means when the animal is taking feed or water from said supply means while confined in said stall means and for generating a weight signal indicative of the weight of the animal;

animal identification signal generating means attached to the animal for generating a unique identification signal for identifying the particular one of the animals in said stall means;

animal identification signal receiving means mounted in juxtaposition to said stall means for receiving the unique identification signal transmitted from said animal identification signal generating means and transmitting a corresponding process identifying signal unique to the particular one of the animals;

computer means for correlating and comparing the process identifying signal and the weight signal for each animal and generating gate control signals for selective separation of each animal from the other animals by closing said entrance gate means and opening said exit gate means for selectively directing each animal from said stall means to said relatively small size pen means.

11. The invention as defined in claim 10 and further comprising:

first control means for opening said entry gate means and closing said exit gate means of said stall means to enable an animal to enter said entry gate means and for selectively closing said entry gate means after an animal has entered said stall means whereby the animal is confined in said stall means so as to be supported by said weighing means while feeding from said feeding means; and second control means for opening said exit gate means while said entry gate means remains closed after a selected animal has been identified by said identification means, and for thereafter closing said exit gate means and opening said entry gate means to permit entry of another animal.

12. The invention as defined in claim 11 and wherein said computer means makes said comparison and correlation and generates said control signal after an animal has been identified and weighed during a first confinement procedure and said second control means is operative during the next succeeding arrival of said animal in anyone of said stall means.

13. The invention as defined in claim 11 and wherein the animals are cattle, and the relatively large size pen means is part of a feedlot for cattle.

14. The invention as defined in any of claims 10, 11, 13 and wherein the said identification signal generating means is mounted on an ear tag attached to the ear of an animal.

15. The invention as defined in claim 14 and wherein said identification signal generating means comprises an electronic chip-type device, an electrical circuit and an energy receiving antenna for operation only in response to energy transmitted thereto from a separate source.

16. The invention as defined in claim 15 and wherein said separate energy source emanates from said identification signal receiving means.

17. The invention as defined in claim 16 and wherein said energy source is an electromagnetic energy source.

18. The invention as defined in claim 10 and wherein said identification signal receiving means is mounted in juxtaposition to said supply means whereby the head of the animal is located in close proximity thereto when the animal's head is in juxtaposition to the feeding means.

19. The invention as defined in claim 10 wherein said stall means comprising a plurality of separate stall areas located in parallel laterally aligned relationship.

20. The invention as defined in claim 19 and wherein said stall areas include at least one pair of adjacent stall areas which have a common side wall. means.

21. A method of automatically monitoring a physical condition of a group of animals or the like and selectively directing selected animals in a retaining area comprising:

attaching an identification signal sending device to each of the animals;

providing an animal attraction means at one end of a stall to cause the animals to voluntarily enter the stall on a one animal at a time basis;

opening the other end of the stall to enable the animals to enter the stall;

causing an identification signal to be automatically generated from said identification signalling device on the animal while the animal is in the stall;

determining a condition of the animal while the animal is in the stall and automatically generating a condition signal representative of the condition of the animal;

correlating the identification signal with the condition signal and automatically comparing the condition of the animal with predetermined criteria to provide a selection control signal when the animal is to be directed to the retaining area;

confining the animal in a stall in response to the selection control signal; and then releasing the animal from the stall through an exitway guiding and limiting movement of the animal only to the retaining area.

22. The method of claim 21 and wherein:

the animal condition is the weight of the animal and causing the animal to stand on a platform-type weighing means in the stall.

23. The method of claims 21 or 22 and wherein:
the identification signal sending device is placed on an ear of the animal;
the animal attraction means is feed or water which is placed in a bowl device;
placing an identification signal receiving device in juxtaposition to the bowl device whereby the identification signal sending device is located in close proximity to the identification signal receiving device; and
causing the identification signal to be generated only when the animal is completely within the stall with its head located in close proximity to the bowl.

24. The method as defined in claim 23 and further comprising:
determining the condition of the animal during a first occasion of location in the stall;
storing the condition signal;
again identifying the animal during a second subsequent occasion of location in the stall; and
then utilizing the selection control signal to selectively direct the animal to the retaining area.

25. A method of separating individual animals from a group of animals such as cattle in a feedlot in accordance with a physical condition of each animal comprising:
attaching an ear tag to each animal in the group of animals which includes an identification transmitting device capable of transmitting a unique identification code signal identifying each separate animal;
generally confining the group of animals in a relatively large pen area so that the animals are free to randomly move about within the relatively large pen area;
providing a plurality of individual stall means with selectively openable and closeable entry gate means at one end of each of the stall means and exit gate stall means at the other end of each of the stall means and a condition sensing means in each stall means;
providing a watering bowl means at the other end of each of the stall means;
locating an identification signal receiving means in juxtaposition to each of the watering bowl means;
automatically closing the exit gate means and opening the entry gate means of each stall means whenever the stall means is empty to enable random entry into each stall means through the open entry gate means of only one animal at a time;
restricting movement of the animal in the stall means to a standing position with the head of the animal located adjacent the water bowl means to enable drinking with the identification transmitting device in operable relationship with said identification signal receiving means and location of the animal in operative relationship with the condition sensing means;
automatically generating an animal identification signal while the animal is in the stall means;
automatically generating an animal condition signal representative of the condition of the animal while the animal is in the stall means;
automatically correlating the identification signal and the animal condition signal and comparing the condition of the animal with pre-established condition criteria and generating control signals for further processing of the animal including an animal separation control signal when the condition of the animal meets pre-established animal condition criteria;
providing a relatively small separate pen area in said relatively large pen area which is selectively connectible to each of the stall means by automatically operable separating gate means;
in the presence of said animal separation control signal providing an exit path leading to the small pen area by actuating the automatically operable separating gate means to enable the animal to move only to the separate pen area after release from the stall means; and
in the absence of said animal separation control signal, providing an exit path leading to the relatively large pen area.

26. The invention as defined in claim 25 and wherein the condition determined is weight and causing the animal to stand on a platform scale means in the stall means.

27. The invention as defined in claim 26 and further comprising:
recording and storing data representative of the time when the animal enters a stall and the time when the animal leaves a stall.

28. The invention as defined in claim 26 and further comprising:
recording and storing data representative of the ambient temperature at the time when the animal is in the stall.

29. The invention as defined in claim 26 and further comprising:
recording and storing data representative of the amount of water drunk by the animal in the stall.

30. The invention as defined in claims 27, 28 or 29 and further comprising:
periodically printing a compilation of recorded data relating to the condition of each animal.

31. The method as defined in claims 25 or 26 and wherein:
the animal separation control signal is generated after the animal leaves the stall means and has returned to the relatively-large pen area and after the condition signal has been generated;
storing the animal separation control signal until the next time the animal enters one of the stall means; and
then actuating the automatically operable separating gate means so as to then move the animal to the separate pen area.

32. The method as defined in claims 25 or 26 and further comprising:
generating an animal identification signal only when said identification transmitting device is located in close proximity to said identification signal receiving device while the animal is completely in the stall and the head of the animal is in close proximity to the water bowl and the identification signal device and the animal is in predetermined position relative to the condition sensing device.

* * * * *